June 28, 1932. C. W. BRENN Re. 18,509

MANIFOLDING BOOK

Original Filed Aug. 20, 1928

INVENTOR.
Carl W. Brenn
BY
ATTORNEY

Reissued June 28, 1932

Re. 18,509

UNITED STATES PATENT OFFICE

CARL W. BRENN, OF MONTCLAIR, NEW JERSEY

MANIFOLDING BOOK

Original No. 1,848,459, dated March 8, 1932, Serial No. 300,680, filed August 20, 1928. Application for reissue filed April 11, 1932. Serial No. 604,625.

This invention relates to improvements in books for manifolding purposes.

In practice, it has been frequently possible to effect economies in paper and printing costs by having some of the tickets or forms making-up a set of manifolding worksheets only as long as is necessary and omitting space and delineations for such entries as are not really needed on such copies. This has been especially true since the appearance on the market of machines manufactured in accordance with the Shoup and Oliver Patent No. 1,396,070, by means of which it is possible to feed simultaneously forms of different lengths and yet have the sets of forms properly aligned and automatically so at the end of each feeding operation. Yet, it was heretofore supposed impossible to utilize these short and long tickets satisfactorily except in cases where the strips are not interfolded in zig-zag fashion to form a block or book.

This supposition was based on the fact that the forms of tickets are used in superposed sets, that is in duplicate, triplicate or quadruplicate, etc., and since the extent of unfolding of the book in use would be controlled by the strips of the longer tickets, a surplus of the strip or strips containing the shorter tickets would accumulate and would tumble about in the register or machine and would ultimately become balled-up and torn.

While the basis of this supposition is not erroneous, the present invention obviates the difficulty above referred to by folding each strip, irrespective of the length of its tickets, in zig-zag fashion along the lines of perforations or other demarcations between adjacent tickets, and then assembling or collating the folded strips so that at one edge of the book the folds of the strip or strips having the longer tickets are nested with the corresponding folds of the strips having the shorter tickets, so that the forms to be used together lie in superposed relation in sets. Consequently, the forms will be consumed in sets and will move from the pile or pack together irrespective of their lengths, and no balling-up of the strips in the register will occur.

Hence, it will be seen that this invention also embraces the method of making manifolding books which consists in separately folding the strip or strips of one length sheets separately from those of other length sheets to make booklets, and then collating or interspersing the folds of one booklet with the folds of another booklet to form the book or pack.

Other features and advantages will hereinafter appear.

In the accompanying drawing—

Figure 1:
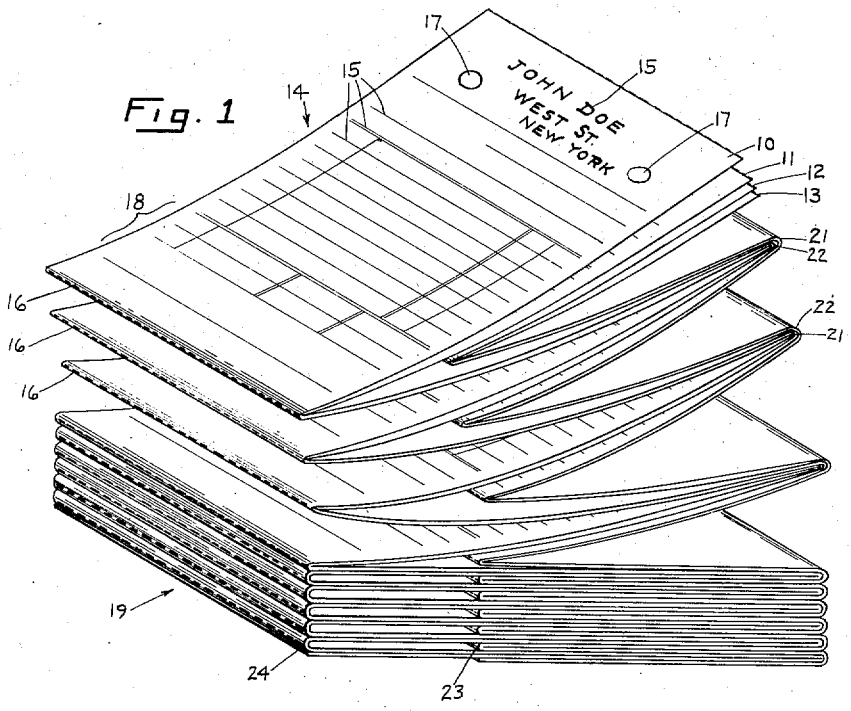
Figure 1 is a perspective view of a manifolding book made in accordance with this invention.

The book of manifolding worksheets shown in the accompanying drawing comprises a plurality of strips 10, 11, 12 and 13 of indefinite lengths. Each of the strips is formed of a succession of tickets 14 which may be provided with printed matter 15, or which may be plain, as desired. Each ticket 14 is separated from its next adjacent ticket in the same strip by a line of perforations 16 along which the strip may be torn to sever one ticket from the next adjacent ticket. The line of perforations 16 also facilitates the operation of folding the strips since it weakens the strips at just the right place for the fold. Each ticket 14 may also be provided with a pair of apertures 17 through the medium of which the feeding operation of the strip is controlled when the strips are used in a register such as disclosed in the Shoup and Oliver Patent No. 1,396,070, which is well known in the art.

It is frequently desired, for the purposes of saving in the cost of the book and for other purposes, to have certain of the tickets shorter in length than others, for it is not always necessary to have all of the information contained on certain of the strips duplicated on other strips. For instance, in the form shown it is not necessary to have the delineated spaces 18, which are provided on the strips 10 and 11, also appear on the strips 12 and 13, and hence the tickets 14 of the strips 12 and 13 may be shorter in length than the tickets of the strips 10 and 11.

While this is a desideratum which has been realized in connection with rolled stationery where each strip is rolled on a separate core, it has been heretofore unobtainable in a zig-zag folded pack or book of worksheets to have the strips folded in superposed relation ready for use, for if the strips 10, 11, 12 and 13 should be folded together in zig-zag fashion at predetermined distances governed by the form lengths of the longer tickets 14 of the strips 10 and 11, it would be necessary for the longer tickets to pull themselves from between a stack of shorter tickets, as the consumption of the pack continues, with the result that the stack of shorter tickets would tumble about in the register and become balled-up and ultimately torn.

Figure 2:
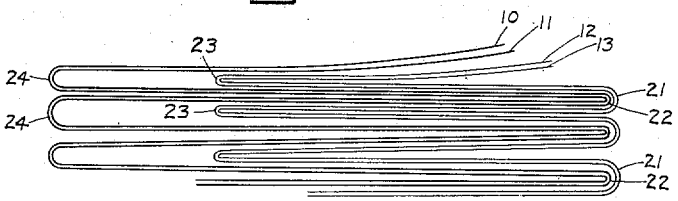
Fig. 2 is a schematic view to show the relative positions of the strips of the finished book.
Figure 3:
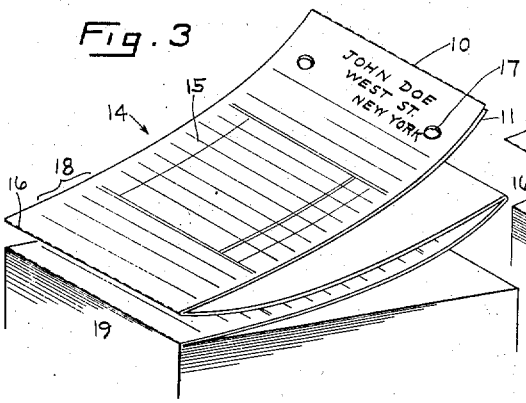
Figs. 3 and 4 are perspective views of the booklets of the longer and shorter tickets respectively, before they are collated or interspersed.
Figure 4:
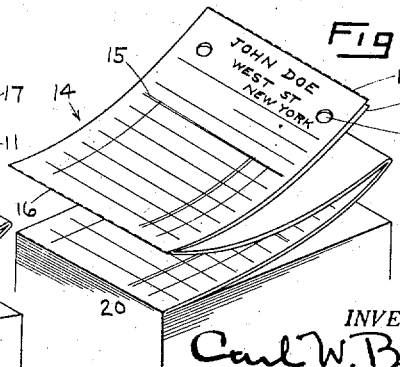

The desideratum above referred to has, however, been obtained by the present invention by folding the strips having the same form lengths, which are the strips 10 and 11 in the form shown, separately and independently of the operation of folding the strip or strips having the shorter form lengths, 12 and 13 in the form shown. Accordingly, the strips 10 and 11, the tickets of which are of the same lengths, are placed in superposed and registering relation and then are folded along the lines of perforations 14 in the usual manner, that is to say by hand, so that a booklet 19 is produced. Then the strips 12 and 13, which are made up of the shorter tickets, are likewise superposed and folded to produce the booklet 20. Finally, to produce the pack, it is merely necessary to interleave or collate the superposed folded sheets of the booklet 19 with those of booklet 20, so that the folds 21 of the strips 12 and 13 embrace and lie upon the folds 22 of the strips 10 and 11, the folds 23 and the strips 12 and 13 being located inside but substantially removed from the folds 24 on the strips 10 and 11. This is clearly shown in Fig. 2, in which the heavy lines indicate the strips 10 and 11 while the lighter lines indicate the strips 12 and 13.

With the worksheets so folded at each feeding operation of the machine, one layer of forms or ticket will be taken from the pile and no surplus length of any strip is allowed to remain in the machine and become balled-up with the other strips.

The manifolding book of this invention may also be produced by the folding machine disclosed in my copending application Serial No. 512,761, filed February 2, 1931, in which the folding machines disclosed in my patent, No. 1,805,161, granted April 12, 1931, and in my application Serial No. 392,540, filed September 14, 1929, have been improved and modified to provide a feed mechanism for feeding the strips form-lengths regardless of the lengths of the forms, so that in the folding operation the folds of the several strips extending in one direction will be nested while the folds in the other direction will be located where they happen to fall.

I claim:

1. A manifolding book comprising a plurality of continuous superposed zig-zag folded worksheet strips, each strip having a succession of forms separated by lines of perforations along which the strip is folded, the forms of one strip being shorter than the forms of another, and having its folds in one direction nested with the folds of the other strip which are in like direction.

2. A manifolding book comprising a plurality of continuous superposed zig-zag folded worksheet strips, each strip having a succession of sheets with folds in opposite directions along the lines where the sheets adjoin, the distance between the folds of one strip being greater than the distance between the folds on another of the strips, and the folds in one direction of one of the strips being nested with the folds in like direction of another of the strips.

3. A manifolding book comprising a plurality of continuous superposed worksheet strips interfolded and nested within each other in zig-zag fashion, each strip having a succession of sheets, the sheets of one strip being shorter than the sheets of another strip, and the strips being each folded along a line of perforations between successive sheets irrespective of the differences in sheet lengths.

4. A manifolding book comprising a plurality of continuous superposed zig-zag folded worksheet strips, each strip having a succession of sheets, the sheets of one strip being shorter than the sheets of another strip, the strips being each folded along a line of perforations between successive sheets irrespective of the differences in sheet lengths, and the strips being nested with the folds in one direction in one of the strips engaging the folds in the same direction of the others of the strips.

5. The herein described steps in the method of making a manifolding book having a plurality of zig-zag folded superpised strips, each of which is a succession of attached sheets and in which the sheets of one strip are greater in length than the sheets of another strip, with the folds occurring at the junction of one sheet with another, which consists in zig-zag folding one of the strips to form a booklet, then separately zig-zag folding the other of the strips to form another booklet, and finally collating the sheets of one booklet with those of another to nest one booklet with the other.

6. The herein described steps in the method of making manifolding books having a plurality of zig-zag folded superposed strips each of which is a succession of attached sheets and in which the sheets of two of the strips are greater in length than the sheets of another strip which consists in superposing the strips of the same length sheets so that the sheets register, then folding the superposed strips in zig-zag fashion along the lines of junction of one sheet with the next to form a booklet, then separately folding the strip of shorter length sheets zig-zag fashion along the lines of junction of one sheet with the next to form another booklet, and finally collating the folded sheets in the superposed condition of the first-named booklet with the folded sheets of the other booklet to nest one booklet with the other.

Signed at Hoboken, in the county of Hudson, and State of New Jersey, this 6th day of April, 1932.

CARL W. BRENN.